March 7, 1961 R. F. WIELE 2,973,925
AERODYNAMICALLY AUTOMATIC AIRFOIL SLAT MECHANISM
Filed March 24, 1958 3 Sheets-Sheet 1
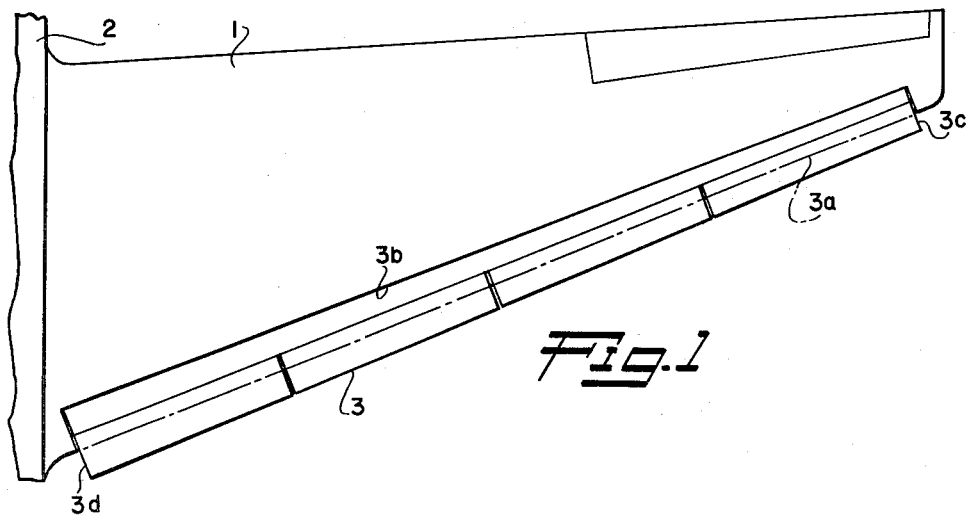
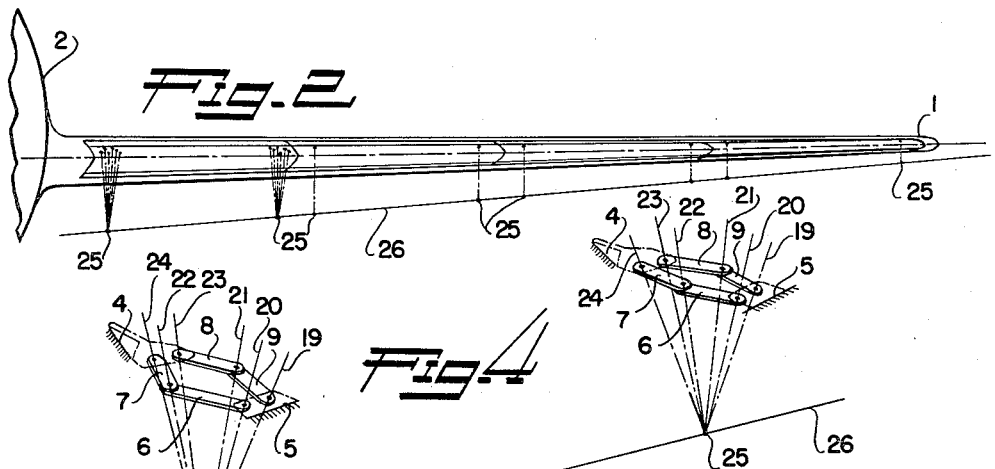
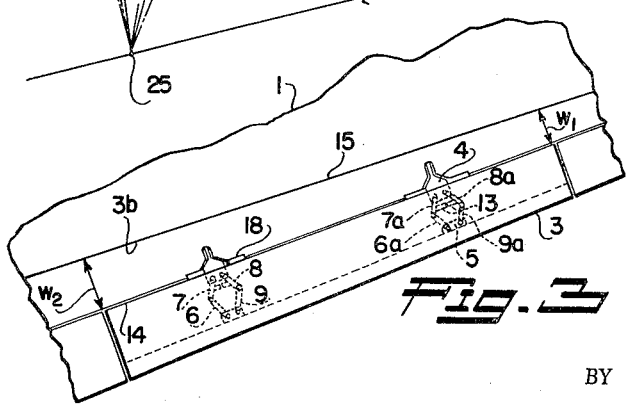
INVENTOR.
ROBERT F. WIELE
BY
Agent

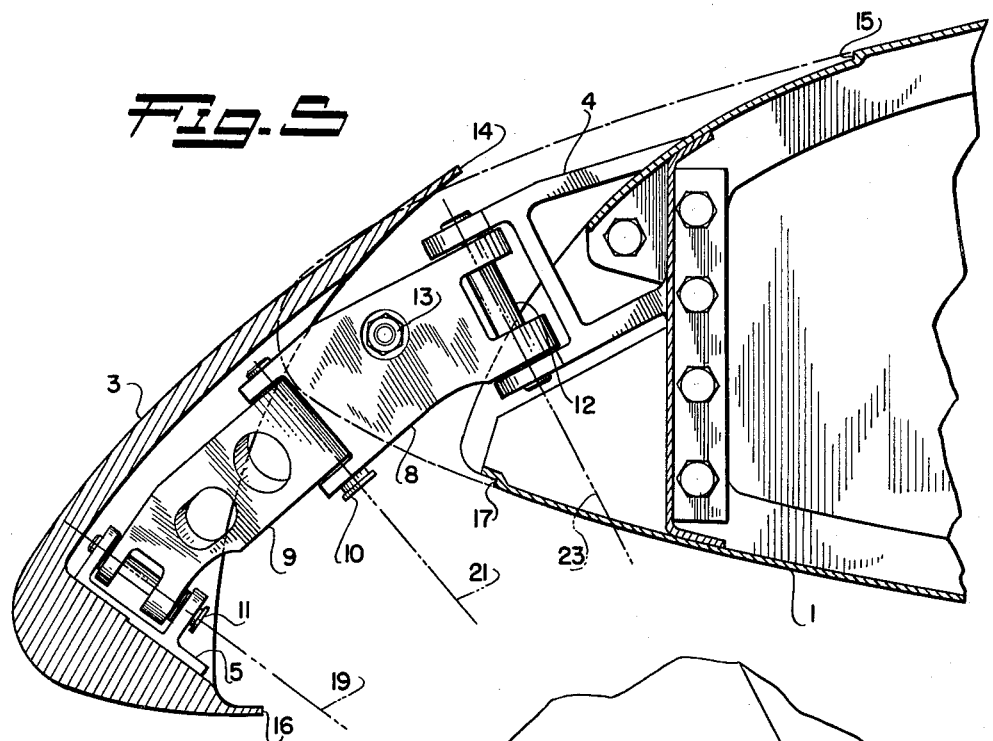
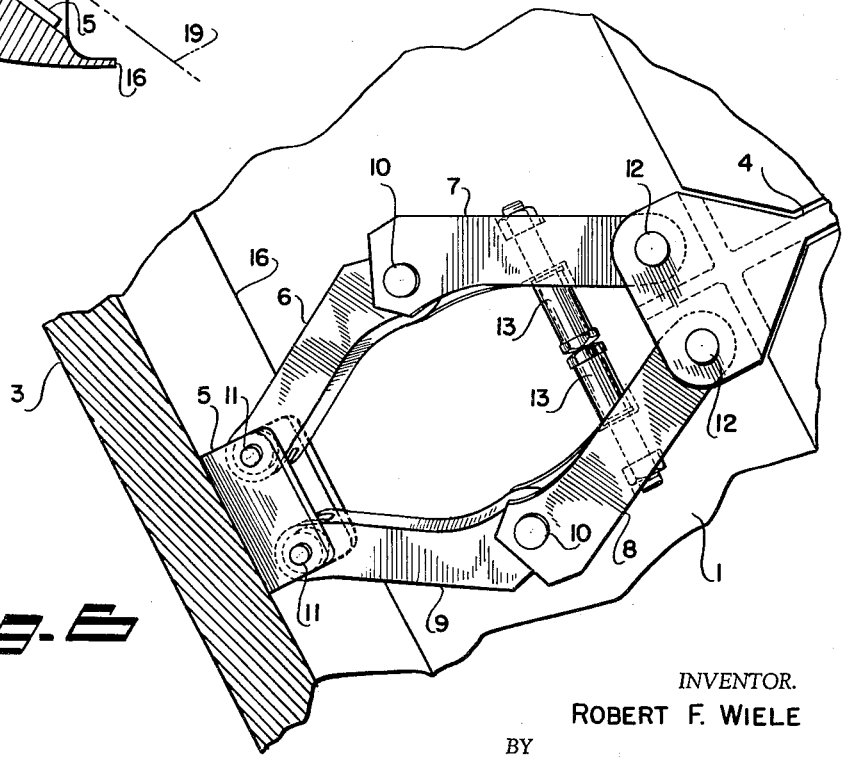

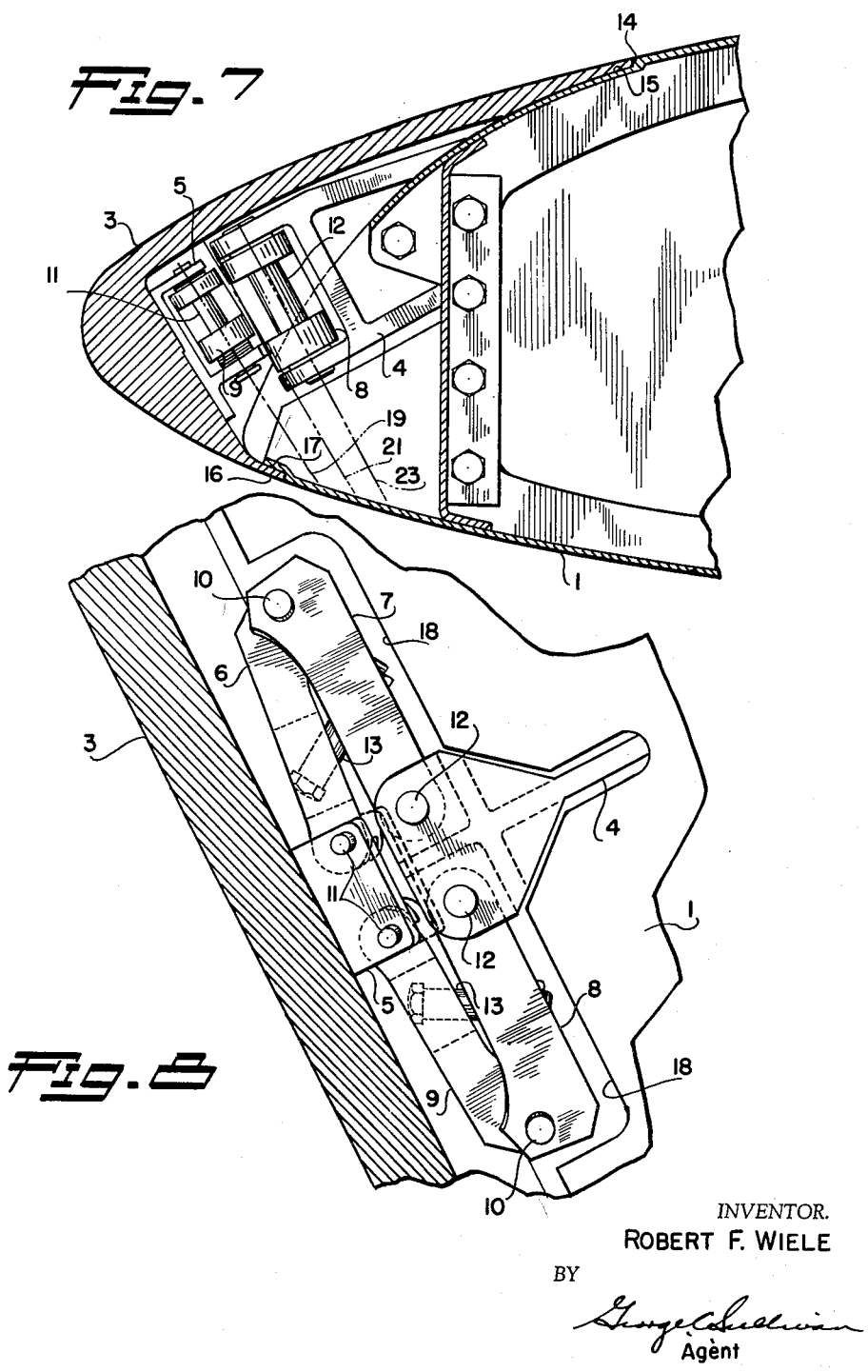

United States Patent Office 2,973,925
Patented Mar. 7, 1961

2,973,925
AERODYNAMICALLY AUTOMATIC AIRFOIL SLAT MECHANISM

Robert F. Wiele, Van Nuys, Calif., assignor to Lockheed Aircraft Corporation, Burbank, Calif.

Filed Mar. 24, 1958, Ser. No. 723,175

11 Claims. (Cl. 244—42)

This invention concerns airfoil slat mechanisms, and more particularly to a slat mechanism that is positioned automatically by the resultant of aerodynamic forces reacting thereupon.

While automatic extendable and retractable airfoil slats positioned relative to the main airfoil by the resultant aerodynamic forces reacting upon the slat proper are known in the prior art, such known devices are inapplicable for use on some modern day, high speed aircraft for any of a variety of reasons. Such difficulties include the fact that some devices have mechanical protuberances extending external of the outer airfoil surface which disturbs the air flow over the airfoil surfaces, thusly creating an aerodynamic drag. Other devices, although located within the confines of the outer surface of the airfoil, result in a spanwise directional component of motion, rather than an extendable motion that is substantially perpendicular to the leading edge of the airfoil, thusly complicating the problem by retractable or mechanically actuable members in modern, high speed, smoothly faired wing structures. Also, such spanwise movements are undesirable in that such introduces local loads into the wing structure in several directions: that is when the slat is retracted, bending moments due to supporting the slat are primarily in a spanwise plane; whereas when the slat extends this plane rotates to a primarily fore and aft direction. This means that the slat supporting link structure must be stiff and strong in several directions, involving additional structure and weight plus the further structural requirements to be considered within the airfoil. By dispensing with the link arrangement, one gets into the realm of mechanical actuators and/or track directing or guide mechanisms. This becomes objectionable in present day aircraft in view of the limited space available due to the thinness of the airfoil and the reduction of space or volume otherwise available for integral fuel tanks or storage.

Accordingly, it is an object of this invention to provide an improved automatically aerodynamic actuated and controlled airfoil slat.

Another object of this invention is to provide an automatically aerodynamic actuated airfoil slat extending in a direction substantially perpendicular to the leading edge of the airfoil.

A further object of this invention is to provide an automatically aerodynamic actuated and controlled airfoil slat with no protuberance from the outer surfaces of the slat and airfoil, regardless of the position of the slat relative to the airfoil.

A still further object of this invention is to provide an automatically aerodynamic actuated and controlled airfoil slat requiring no internal airfoil structural additions or considerations for inclusion of a mechanical actuator or track or guide means for directional control of the slat.

Another object of this invention is to provide an automatically aerodynamic actuated and controlled airfoil slat actuating mechanism without requiring an angle of attack indicator for controlling the repositioning of the slat.

It is a still further object of this invention to provide an automatically aerodynamic actuated and controlled airfoil slat capable of maintaining the integral airfoil space or volume available for fuel storage.

A still further object of this invention is to provide an automatically aerodynamic actuated and controlled airfoil slat actuating mechanism without requiring a protuberance or fairing for a slat actuating mechanism in thin airfoil structures.

It is another object of this invention to provide an automatically aerodynamic actuated and controlled airfoil slat with simplified actuating mechanism for producing a variable width slot containing few simplified and inexpensive parts.

Further objects and advantages of this invention will become apparent from the following description taken in connection with the accompanying drawings in which:

Figure 1 is a plan view of an aircraft wing incorporating one embodiment of this invention with a leading edge slat shown in extended position by solid lines, and in retracted position by phantom lines;

Figure 2 is an elevational view of the leading edge of an aircraft wing showing diagrammatically the intersection of slat hinge pivotal axes with the external slat rotational axis;

Figure 3 shows two of the slat link mechanisms wherein the links are of different sizes to accomplish the slat describing a conical surface of revolution during repositioning movement;

Figure 4 is an enlarged view depicting the details of the intersection of all pivotal hinge axes of each of two link mechanisms at a common point on the external slat rotational axis;

Figure 5 is an enlarged partial chord-wise cross-sectional view of the leading edge of a wing showing the slat in extended position;

Figure 6 is an enlarged partial cross-sectional plan view of the extended slat as shown in Figure 5;

Figure 7 is similar to Figure 5 with the slat in the retracted position; and

Figure 8 is similar to Figure 6 with the slat in retracted position.

Generally stated, the invention is practiced by mounting an extendable slat to the leading edge of an airfoil by a plurality of link mechanisms comprising two pairs of connected links, each pair of connected links in turn connected to fittings on the slat and the wing, so as to permit the slat to be repositioned relative to the leading edge of the airfoil in an arcuate movement or rotation about an externally spaced axis whereby the slat describes the surface of a cylinder or a cone. The pivotal or hinge axes of both fittings and the connection between each pair of links are angulated to each other that they all pass through the external axis of rotation of the slat at a common point. By proportioning each set of links in proper relation to the external slat axis of rotation, the slat can operate to describe a conical surface about the external slat rotational axis, or if all links are identical in length, the slat can operate to describe a cylindrical surface about the external slat rotational axis.

Referring more particularly to the drawings, one embodiment of this invention shown in Figure 1 has an airfoil or wing structure 1 extending laterally from an aircraft fuselage 2 and having a leading edge slat 3 extending therefrom. While the slat 3 is shown in solid line as extended from the leading edge of airfoil 1, phantom line 3a indicates the forward edge of the slat 3 when in retracted position. It is to be noted that extension of slat 3 is in a direction perpendicular to the leading edge of wing 1, and incorporated on a wing structure that has a swept leading edge, as shown, the direction of slat extension will be at an angle to the true translational direction of flight.

While I have shown the slat 3 as being comprised of a plurality of segments, which can be integrated into substantially one slat by connection of adjacent segments at their adjacent ends, it is to be understood that the entire spanwise length of slat 3 may be one integral or unitary structure if so desired. Likewise, hereinafter when referring to slat 3 it is to be understood that I am talking about the entire spanwise unitary structure or segmental structure, whichever the case may be.

Referring to Figures 5 through 8, there are a plurality of fittings 4 secured to the wing 1 at the leading edge thereof and a plurality of fittings 5 secured to an internal surface of slat 3. Connection of slat 3 to wing 1 is accomplished by two pairs of link members 6, 7, 8 and 9 between each pair of fittings 4 and 5. Link members 6 and 7 are pivoted together by a hinge or pin 10, with the other end of link 6 pivotally connected to fitting 5 with a hinge or pin 11, and the other end of link 7 pivotally connected to fitting 4 by hinge or pin 12. Likewise, links 8 and 9 are pivotally connected together by a hinge or pin 10, with the other end of link 9 pivotally connected to fitting 5 by a pin 11, and the other end of link 8 pivotally connected to fitting 4 by a hinge or pin 12. There is a bolt assembly 13 secured to each of link members 7 and 8, which serve as extension stops or limits for controlling the amount of extension of slat 3 from wing 1. With the bolts 13 being threaded, adjustability of the amount of slat extension can be accomplished quite readily. It is also to be understood that any type of slat extension stop or limiting structure may be used.

When slat 3 is retracted, it is snugly juxtaposed against the leading edge of the wing so that the upper trailing edge 14 of slat 3 fits into a recess 15 on the upper surface of wing 1 whereupon when slat 3 is retracted, the upper surface of slat 3 is a continuation of the upper surface of wing 1, as can more clearly be seen in Figure 7. Likewise, the lower trailing edge 16 of slat 3 nests in recess 17 in the lower surface of wing 1, and when slat 3 is retracted the lower outer surface of slat 3 is a continuation of the lower surface of wing 1, again which can be most clearly seen in Figure 7. There are cut-outs or recesses 18 along the leading edge of wing 1, into which the link mechanisms fold when the slat 3 is in the retracted position, as most clearly shown in Figure 8.

The connecting link mechanisms are constructed so that the hinge or pivotal axis of each of the hinge or pin members 10, 11 and 12 are all at a slight relative angular displacement to each of the other hinge or pin axes, with all of the hinge or pin axes of each mechanism intersecting at a fixed point external of the airfoil or wing structure, regardless of the angular and/or lineal displacement of each hinge or pin axis to any or all of the other hinge or pin axes.

In order to accomplish the most efficiency from utilization of a slat, it is well known that as the slat is extended from the wing, that an increasing relative angle of incidence between the slat chord and wing chord must occur; that is, the relative angle of incidence between the slat chord and wing chord when retracted must be less than the relative angle of incidence between the slat chord and wing chord when the slat is fully extended, with the relative angle of incidence gradually increasing as the slat moves from a retracted to an extended position. Therefore, the slat should follow a curvic path during movement, and the radius of the curvic path is about a fixed point of rotation external of the wing structure. The axis of rotation of the slat during movement can be defined by a line extending between the centers of rotation of both spanwise ends of the slat, and such axis will intersect the center of rotation of any spanwise station or point of the slat.

Referring to Figure 4, there is shown a diagrammatic representation of how the pivotal axes of hinges 10, 11 and 12 in each link mechanism intersect at a common point, that is the pivot axes 19 and 20 of pins 11, pivot axes 21 and 22 of pins 10, and pivot axes 23 and 24 intersect at a common point 25. The point of intersection 25 of all of the pivot axes 19 through 24 of each link mechanism also falls on the slat axis of rotation as defined above, and as indicated by 26. By the slight angular relationship of each pivot axis to each other, each individual pivot axis will intersect each of the other pivot axes at point 25 on the slat rotational axis 26. For example, pivot axes 19 and 20, which represent pins or hinges 11 connecting links 6 and 9 to slat fitting 5, will rotate around point 25 in a plane at a slight angle to an absolute perpendicular plane to the slat axis of rotation 26, the rotational plane of pivot axis 19 being slightly angulated to one side of a plane through point 25 perpendicular to slat rotational axis 26, while the plane of pivotal axis 20 is slightly angulated in the opposite direction to a plane through point 25 perpendicular to slat rotational axis 26. Pivotal axes 23 and 24, which represent hinges or pins 12 connecting links 7 and 8 to wing fitting 4, remain fixed relative to point 25. The pivotal axis 23 is slightly angulated in one direction from a plane containing point 25 that is perpendicular to slat rotational axis 26, while pivotal axis 24 is slightly angulated to such plane in an opposite direction. Movement of pivotal axes 21 and 22 during movement of slat 3 each describe a conical surface, the apex of which is located at point 25 with the axes of each of the conical surfaces described or generated by pivotal axes 21 and 22 being pivotal axes 23 and 24 respectively.

As indicated above, the slat 3 may be moved relative to the wing 1 so as to describe a cylindrical surface or a conical surface. To describe a cylindrical surface, the angular co-relationships of each pivotal axis relative to each other and intersection point 25 are identical for all link mechanisms. For the slat 3 to describe the surface of a cone, the angular co-relationships of each pivotal axis relative to the other and intersection point 25 are slightly changed or different in each link mechanism as are the length of the link members between the pivotal axes centers, so as to describe a slat axis of rotation 26 that is at an angle to the spanwise center of slat 3, as is indicated in Figure 2. The resulting difference between a slat describing a cylindrical surface as compared to a conical surface is that the width of the slot between the slat 3 and wing 1, will be of constant width when the slat 3 describes the surface of a cylinder, whereas when the slat 3 describes the surface of a cone as seen in Figure 2, the width of slot 3b between slat 3 and wing 1 will be variable as will be seen in Figure 1. This is accomplished in that while outboard end 3c of slat 3 describes the same amount of radial arc as does inboard end 3d, inboard end 3d describes the arc on a larger radius than outboard end 3c resulting in a larger chord for the arcuate swing of inboard end 3d as compared to the chord of the arc described by outboard end 3c.

Referring to Figure 3, it can be seen that with the shorter links 6a, 7a, 8a and 9a as compared to the longer links 6, 7, 8 and 9, the width dimension $W_1$ of slot 3b is smaller than the width dimension $W_2$. It is of course to be understood that if the links of the two link mechanism depicted were of equal length, width dimensions $W_1$ and $W_2$ of slot 3b would be the same.

It should also be understood that the appropriate design of the angular relationship between pivotal axes of the link mechanisms, variation can be accomplished of the angle of attack at which slat extension will begin, as well as the rate of slat extension relative to angle of attack and the radius of slat arcuate travel.

In operation, the flow of air over the slat 3 will result in an upward directed resultant force component. Should the direction of the resultant force component pass behind slat rotational axis 26, that is, pass between slat rotational axis 26 and the trailing edge of wing 1, the force will react on slat 3 to rotate around axis 26 and extend away from wing 1. As slat 3 moves, there will be a relocation or redirection of the resultant force component acting on slat 3 so that extension of slat 3 will cease when the direction of the resultant force component passes through axis 26 or further extension is stopped by stop bolts 13, whichever occurs first. The slat 3 will be retracted, or moved toward wing 1 when the resultant force component of the slat passes forward of the axis 26.

Thus it can be seen, that I have provided an aerodynamic automatically controlled airfoil slat mechanism whereby the slat is prositioned by the resultant aerodynamic force component on the slat so as to rotate the slat in an arcuate path, whether the slat describes a cylindrical surface or conical surface. Also, I have dispensed with any mechanical actuating means and such devices as angle of attack indicators to indicate the angle of attack of the airfoil 1 for control of a mechanical actuator. Furthermore, practice of this invention does not require any protuberances from the outer surfaces of the slat and/or airfoil, nor is there any intercalation of the slat actuating mechanism into the interior of the airfoil or wing structure which would result in requirement of additional interior wing structure. A further advantage of this invention would be present should it be incorporated on a wing structure having integral fuel storage space in that no reduction of such fuel space or volume takes place due to inclusion of an adjustable slat actuating mechanism, although the link mechanisms can be used for guiding slot movement should a mechanical actuating means be used.

While a particular embodiment of the invention has been illustrated and described, it will be obvious to those skilled in the art that various changes and modifications may be made without department from the invention and it is intended to cover in the appended claims all such modifications and equivalents as fall within the true spirit and scope of this invention.

What is claimed is:

1. A guide means for controlling the path of a movable slat from the leading edge of an airfoil comprising a plurality of fittings secured to said slat, a plurality of fittings secured to the leading edge of said airfoil, a plurality of link mechanisms, each link mechanism having two pairs of link members, a pair of first hinge means, each of said first hinge means pivotally joining a pair of links together, a pair of second hinge means, each of said second hinge means pivotally connecting one end of each of said pair of links to the slat fitting, and a third pair of hinge means, each of said third hinge means pivotally connecting the other end of each of said pairs of links to the wing fitting, said pairs of links pivotally folding or unfolding together during movement of the slat relative to the wing, the axes of one of said pairs of hinge means being angulated relative to each other to guide said slat movement perpendicularly to the wing leading edge.

2. A link mechanism for controlling the path of a slat in spanwise collimation along the leading edge of an airfoil during adjustment of the slat relative to the airfoil leading edge comprising a first pair of links pivotally connected together, a second pair of links pivotally connected together, a fitting means secured to the airfoil leading edge, a fitting means secured to the slat trailing side, and a plurality of hinge means, said hinge means pivotally connecting one end of said first and second pairs of links to the airfoil fitting and the other end of said first and second pairs of links to the slat fitting, the pivotal connections of each pair of links having their axes angulated relative to each other and having opposite spanwise directional movements relative to each other during extension or retraction of the slat relative to the airfoil.

3. A slat path control link mechanism as claimed in claim 2, wherein the two pairs of links include integral stop means limiting the maximum extension of the slat.

4. A slat path control link mechanism as claimed in claim 3, wherein the integral stop means are adjustable for varying the maximum extension limit of the slat.

5. A link mechanism for controlling the path of a slat in spanwise collimation along the leading edge of an airfoil during adjustment of the slat relative to the airfoil leading edge comprising a first pair of links pivotally connected together, a second pair of links pivotally connected together, a fitting means secured to the airfoil leading edge, a fitting means secured to the slat trailing side, and a plurality of hinge means, said hinge means pivotally connecting one end of said first and second pairs of links to the airfoil fitting and the other end of the said first and second pairs of links to the slat fitting, the pivotal axis of each pivotal connection being slightly angulated relative to the pivotal axes of all the other pivotal connections of said link mechanism, all of said pivotal axes intersecting at a common point external of the slat and airfoil structure, said point of intersection describing a center of rotation of arcuate travel of the slat relative to the airfoil about a plane perpendicular to the airfoil leading edge.

6. An airfoil having a leading edge, an extendable slat fitting against the airfoil leading edge in spanwise collimation when in retracted position, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means, said hinge means pivotally connecting one end of said first and second pairs of links to an airfoil fitting and the other end of said first and second pairs of links to a slat fitting thereby connecting the slat to the airfoil leading edge, the pivotal axis of each pivotal connection being slightly angulated relative to the pivotal axes of all the other pivotal connections of said link mechanism, all of said pivotal axes of each link mechanism intersecting at a common point external of the slat and airfoil structure, said points of intersection of all link mechanisms defining an axis of rotation of the slat relative to the airfoil leading edge whereby the slat extension or retraction describes a cylindrical surface around the slat rotational axis.

7. An airfoil having a leading edge, an extendable slat fitting against the airfoil leading edge in spanwise collimation when in retracted position, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means, said hinge means pivotally connecting one of said first and second pairs of links to an airfoil fitting and the other end of said first and second pairs of links to a slat fitting thereby connecting the slat to the airfoil leading edge, the pivotal axis of each pivotal connection being slightly angulated relative to the pivotal axes of all the other pivotal connections of said link mechanism, all of said pivotal axes of each link mechanism intersecting at a common point external of the slat and airfoil structure, said point of intersection of all link mechanisms defining an axis of rotation of the slat relative to the airfoil leading edge whereby the slat extension or retraction describes a cylindrical surface around the slat rotational axis, the pivotal connections of each pair of links having opposite spanwise directional movements relative to each other during extension or retraction of the slat relative to the airfoil.

8. An airfoil having a leading edge, an extendable slat fitting against the airfoil leading edge in spanwise collimation when in retracted position, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means, said hinge means pivotally connecting one end of said first and second pairs of links to an airfoil fitting and the other end of said first and second pairs of links to a slat fitting thereby connecting the slat to the airfoil leading edge, the pivotal axis of each pivotal connection being slightly angulated relative to the pivotal axes of all the other pivotal connections of said link mechanism, all of said pivotal axes of each link mechanism intersecting at a common point external of the slat and airfoil structure, the relative angularity between the pivotal axes and the link lengths in each link mechanism being different than those in the other link mechanisms resulting in the intersection points of the link mechanisms having varying locational relationships to the slat spanwise centerline, said point of intersection of all link mechanisms defining an axis of rotation of the slat relative to the airfoil leading edge whereby the slat extension or retraction describes a conical surface around the slat rotational axis.

9. An airfoil having a leading edge, an extendable slat fitting against the airfoil leading edge in spanwise collimation when in retracted position, the slat chord angularly disposed relative to the airfoil chord, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means, said hinge means pivotally connecting one end of said first and second pairs of links to an airfoil fitting and the other end of said first and second pairs of links to a slat fitting thereby connecting the slat to the airfoil leading edge, the pivotal axis of each pivotal connection being slightly angulated relative to the pivotal axes of all the other pivotal connections of said link mechanism, all of said pivotal axes of each link mechanism intersecting at a common point external of the slat and airfoil structure, said points of intersection of all link mechanisms defining an axis of rotation of the slat relative to the airfoil leading edge whereby the slat extension or retraction describes a cylindrical surface around the slat rotational axis, and said slat extension or retraction around the slat rotational axis varying the relative angular relationship between the slat chord and airfoil chord.

10. An airfoil having a leading edge, an extendable slat fitting against the airfoil leading edge in spanwise collimation when in retracted position, the slat chord angularly disposed relative to the airfoil chord, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means, said hinge means pivotally connecting one end of said first and second pairs of links to an airfoil fitting and the other end of said first and second pairs of links to a slat fitting thereby connecting the slat to the airfoil leading edge, the pivotal axis of each pivotal connection being slightly angulated relative to the pivotal axes of all the other pivotal connections in said link mechanism, all of said pivotal axes of each link mechanism intersecting at a common point external of the slat and airfoil structure, the relative angularity between the pivotal axes and the link lengths in each link mechanism being different than those in the other link mechanisms resulting in the intersection point of the link mechanisms having varying location relationships to the slat spanwise centerline, said points of intersection of all link mechanisms defining an axis of rotation of the slat relative to the airfoil leading edge whereby the slat extension or retraction describes a conical surface around the slat rotational axis, and said slat extension or retraction around the slat rotational axis varying the relative angular relationship between the slat chord and the airfoil chord.

11. An airfoil having a leading edge, an extendable slat fitting against the airfoil leading edge in spanwise collimation when in retracted position, a plurality of fitting means connected to the airfoil leading edge in spanwise spaced relationship therealong, a plurality of fitting means connected to the trailing side of the slat in identical spanwise spaced relationship therealong as the airfoil fitting means, in combination with a plurality of link mechanisms, each of said link mechanisms controlling the path of the slat during adjustment of the slat relative to the airfoil leading edge and comprising a first pair of links pivotally connected together, a second pair of links pivotally connected together, and a plurality of hinge means said hinge means pivotally connecting one end of said first and second pairs of links to an airfoil fitting and the other end of said first and second pairs of links to a slot fitting thereby connecting the slot to the airfoil leading edge, all of said pivotal axes of each link mechanism slightly angulated relative to each other and intersecting at a common point external of the slot and airfoil structure, both pivotal axes of the hinges connecting the pairs of links to the airfoil fitting being stationary during extension or retraction of the slat and angulated to opposite sides of a plane perpendicular to the slat centerline, both pivotal axes of the hinges connecting the pairs of links to the airfoil fitting moving arcuately in planes angulated to opposite sides of a plane perpendicular to the slat centerline during extension or retraction of the slat, the pivotal axes of the pivotal connections between each pair of links describing a conical surface around a centerline of the pivotal axes of the hinges connecting the pairs of links to the airfoil fittings during extension or retraction of the slot, and said points of intersection of all link mechanisms defining a slat axis of rotation for a slat rotational movement therearound during extension or retraction of the slat relative to the airfoil leading edge.

References Cited in the file of this patent

UNITED STATES PATENTS

| | | |
|---|---|---|
| 1,394,344 | Page | Oct. 18, 1921 |

FOREIGN PATENTS

| | | |
|---|---|---|
| 395,840 | France | Jan. 8, 1909 |
| 404,149 | Great Britain | Jan. 11, 1934 |